HENRY B. LEE.
Improvement in Brakes for Vehicles.
No. 119,932. Patented Oct. 17, 1871.
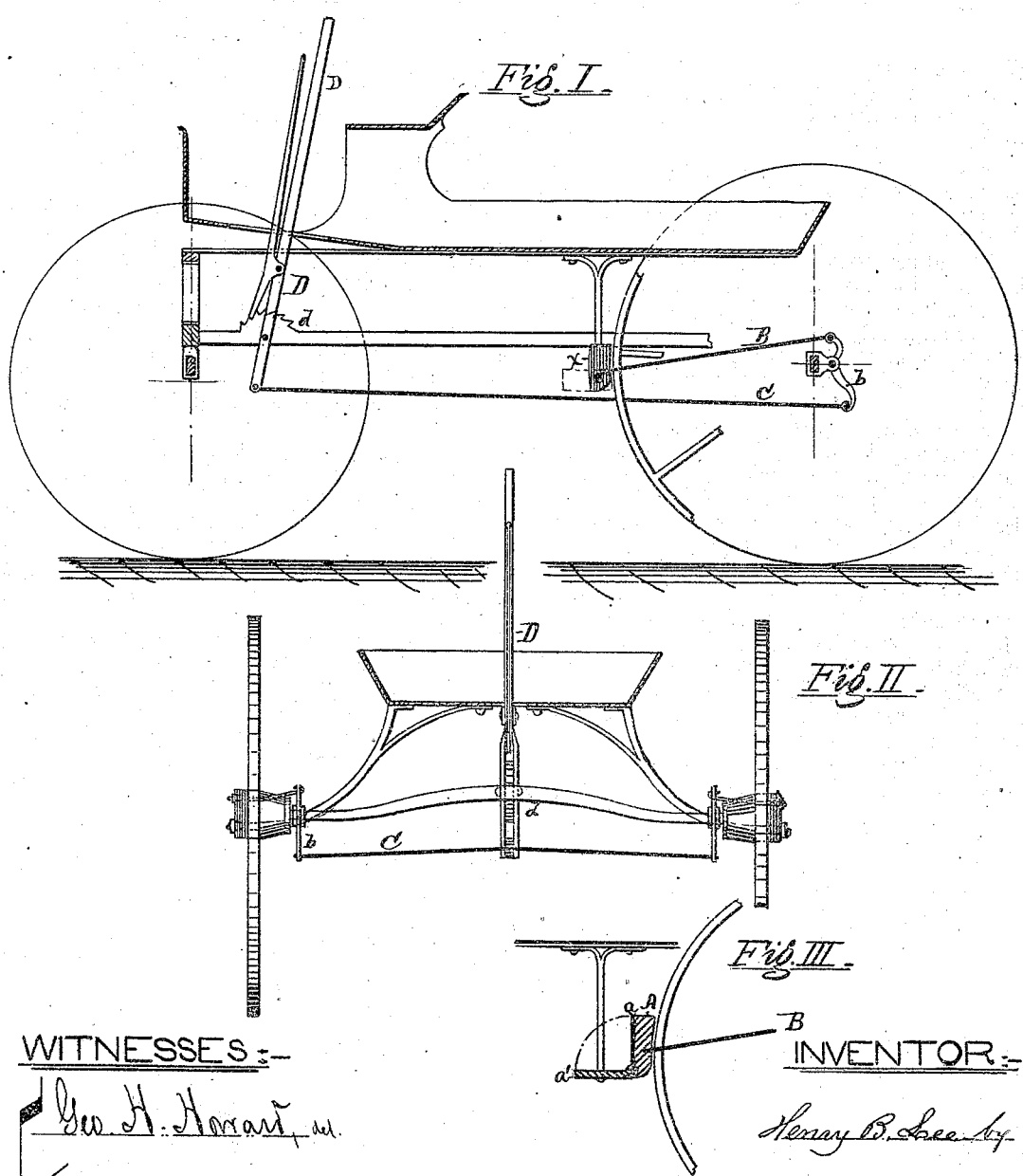

UNITED STATES PATENT OFFICE.

HENRY B. LEE, OF MARYVILLE, MISSOURI.

IMPROVEMENT IN BRAKES FOR VEHICLES.

Specification forming part of Letters Patent No. 119,932, dated October 17, 1871.

*To all whom it may concern:*

Be it known that I, HENRY B. LEE, of Maryville, in the county of Nodaway and State of Missouri, have invented a new and useful Improvement in Brake or Lock for Vehicles; and I do hereby declare that the following is a full and exact description of the same, reference being had to the accompanying drawing and to the letters of reference marked thereon.

This invention has for its object the production of a simple brake for spring vehicles which shall work independently of the motion of the bed or body of the vehicle; and consists in certain details of construction, which will be fully described hereinafter.

In the drawing, Figure 1 represents a side elevation, partially in section, of a buggy having my invention applied thereto. Fig. 2 represents a front elevation partially in section. Fig. 3, an enlarged view of the buggy-step and brake.

To enable others skilled in the art to make and use my invention, I will now proceed to describe fully its construction and operation.

A represents the rub-block which is securely attached, in any proper manner, to the leaf $a$, which is suitably hinged to the rear side of the step $a$, Fig. 3, as shown. B represents a connecting-rod attached at one end by a suitable joint to the free end of the rub-block A, and at the other to the crooked lever $b$, pivoted to the axle, as shown. C also represents a connecting-rod which unites the other end of lever $b$ with the hand or foot-treadle D, which latter extends upward through a slit or other proper opening in the bottom of the buggy. $d$ represents a ratchet and pawl by means of which the lever is held in any desired position. If desired, the step may be dispensed with and the rub-block be used for that purpose, as shown in Fig. 1.

The operation is as follows: By means of the lever D and its connections the rub-block may be drawn against the wheel when desired, and thus operated to lock it securely, or it may be operated to free the block from contact with the wheel. When the rub-block is not in place against the wheel it is turned forward upon the step.

Having thus fully described my invention, what I claim as new, and desire to secure by Letters Patent, is—

1. The combination of a rub-block and step for vehicles, constructed and arranged as set forth.

2. The combination of the lever D with the connecting-rods C and B, lever $b$, and rub-block $x$, as described.

This specification signed and witnessed this 19th day of July, 1871.

HENRY B. LEE.

Witnesses:
J. W. STRONG,
THOS. H. BROWN.

(31)